Dec. 19, 1950     G. E. KING     2,534,917
SYNCHRONIZED HOIST CONTROL FOR DREDGE DRAGLINES
Filed April 19, 1947
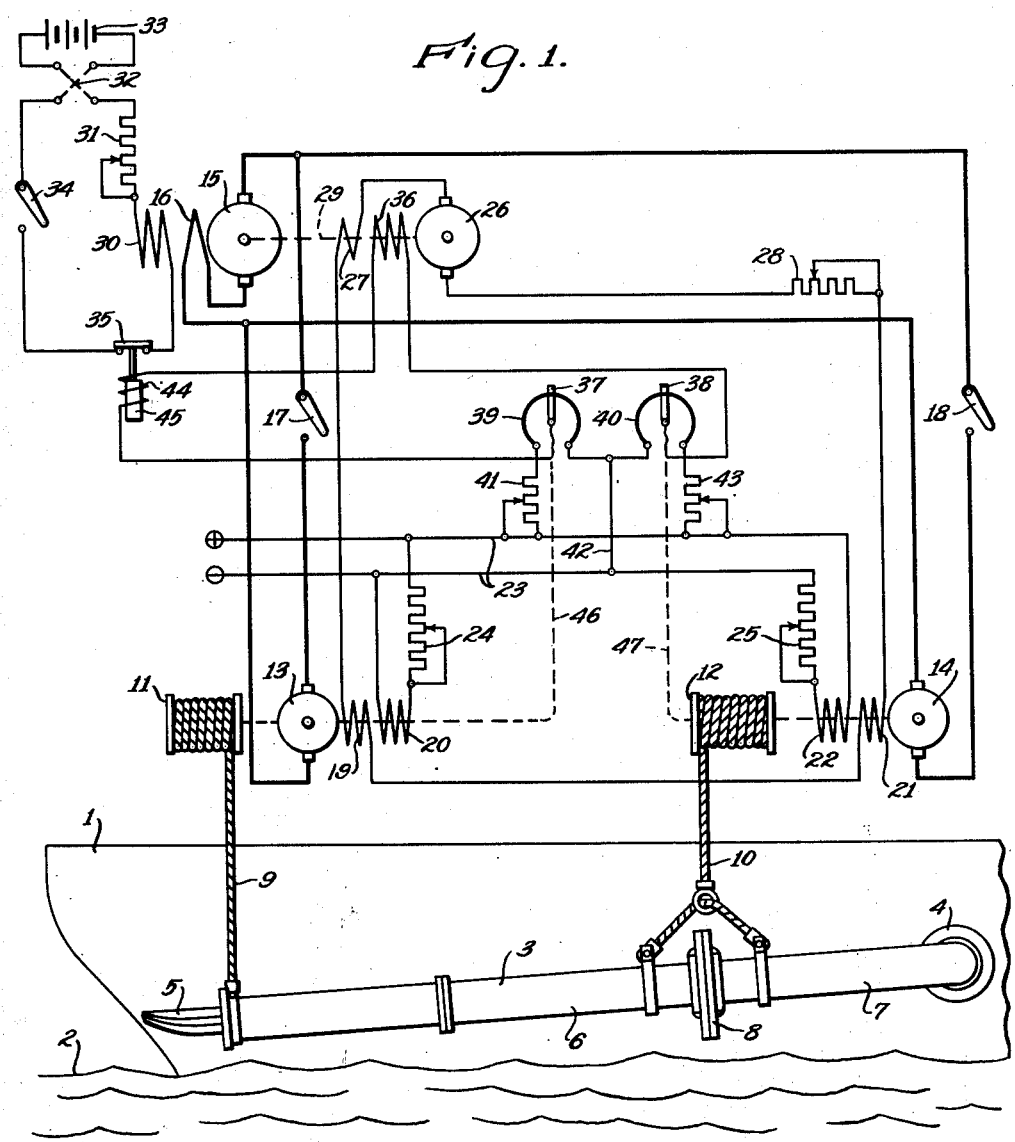
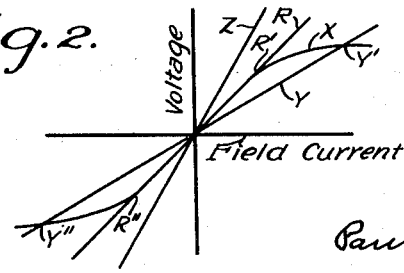
WITNESSES:
Robert C. Baird
Nw. C. Goome
INVENTOR
George E. King.
BY
Paul E. Friedemann
ATTORNEY Patented Dec. 19, 1950

2,534,917

UNITED STATES PATENT OFFICE 2,534,917

SYNCHRONIZED HOIST CONTROL FOR DREDGE DRAGLINES

George E. King, Edgewood, Pa., assignor to Westinghouse Electric Corporation, East Pittsburgh, Pa., a corporation of Pennsylvania Application April 19, 1947, Serial No. 742,613

15 Claims. (Cl. 37—58)

This invention relates to positioning control apparatus and, more particularly, to apparatus for regulating the relative positions of the separate sections of a drag-pipe during raising and lowering operations with respect to a dredging ship on which the drag-pipe is mounted.

In certain types of dredging operations, the dredging ship is provided with a drag-pipe which is dragged over the bed of a body of water and through which the silt and muck to be dredged is drawn into the body of the dredging ship. The drag-pipe is pivotally connected to the ship with which the dredging operations are conducted and is constructed of two relatively movable sections coupled together by a flexible coupling. When the drag-pipe is pivotally moved about its point of connection to the ship during raising and lowering operations, it is desirable that the relatively movable sections of the drag-pipe be maintained in predetermined relative axial positions with respect to each other. Specifically, this invention in one of its aspects deals with apparatus for raising and lowering a drag-pipe which is effective to maintain the relative positions of the drag-pipe sections during raising and lowering. In a broader sense, this invention deals with a control system for maintaining two objects in positional agreement with each other as they are moved from one position to another.

One of the principal objects of this invention is to provide apparatus for controlling the operation of drag-lines during raising and lowering operations of a drag-pipe which is effective to maintain the relative positions of sections of the drag-pipe with respect to each other during raising and lowering operations.

A further object of the invention is to provide a control system for maintaining a pair of motors or motor-driven elements in positional agreement with each other.

A further object of the invention is to provide, in a control system of the character referred to, a pair of rheostats which are adjustable to positions corresponding, respectively, to the movement of a pair of motors or motor-driven objects together with control apparatus responsive to the positional disagreement of the rheostats for regulating the operation of the motors in such manner to maintain the motors or objects driven thereby in positional agreement with each other.

A still further object of the invention is to provide a novel arrangement of an amplifying generator for regulating the operation of a pair of motors or objects driven thereby so as to maintain such motors or objects in positional agreement with each other.

Other objects and advantages of the invention will become apparent from the following description.

In the drawing there is shown a preferred embodiment of the invention. In this showing:

Fig. 1 is a diagrammatic sketch illustrating the construction of a motor control system corresponding to the principles of this invention, and Fig. 2 is an explanatory graph.

Referring to Fig. 1 of the drawing, the numeral 1 designates the stern of a dredge ship supported by a body of water 2. A drag-pipe 3 is pivotally connected at one end 4 to the ship 1 for pivotal movement from a raised position, as illustrated, to a lowered position, in which the free end 5 of the drag-pipe will be engaged with the material to be dredged from the bed of the water 2 through the drag-pipe 3. The drag-pipe 3 is formed of two sections 6 and 7 connected together by a flexible coupling 8. During raising and lowering movements of the drag-pipe 3 relative to the ship 1, it is desirable to maintain the drag-pipe sections 6 and 7 in axial alignment or at a predetermined angular position relative to each other.

To raise and lower the drag-pipe 3, a dragline 9 is connected thereto adjacent its free end 5, and a drag-line 10 is connected thereto adjacent the flexible coupling 8. The draglines 9 and 10, respectively, are operated by dragwinches 11 and 12. The drag-winch 11 is mechanically connected to a motor 13, and the dragwinch 12 is similarly connected to a motor 14. Reduction gearing (not shown) will be provided in actual practice for connecting the motors 13 and 14 to the winches 11 and 12 driven thereby. Since the drag-line 9 must travel through a greater distance than the drag-line 10 due to the arcuate path of travel of the points of connection of the drag-lines 9 and 10 to the dragpipe 3 about different radii during raising and lowering operations, provision may be made in the gear reduction mechanism connecting the drag-winches to their driving motors for compensating for such difference in movement. As an alternative and preferable scheme for compensating for the different distances of travel of the points of connection, the drums or winches 11 and 12 may be built with different size diameters so that a given movement of each winch will pay out or heave in a different length of drag-line.

The motors 13 and 14 have their terminals connected in parallel with the terminals of a direct-current generator 15 which is provided with a stabilizing series field 16. A suitable motor (not shown) is provided for driving the generator 15 at a constant speed. Manually operable switches 17 and 18 are provided in the connections of the motors 13 and 14 to the generator 15, in order that such motors may be operated at will independently of each other.

Field windings 19 and 20 are provided for controlling the operation of the motor 13 and similar field windings 21 and 22 are provided for controlling the operation of the motor 14. The windings 20 and 22 are of separately excited type and are connected to a suitable source of direct-current potential, such as the direct-current buses 23, through manually adjustable rheostats 24 and 25. Adjustment of the rheostats 24 and 25 will be effective to vary the speed of operation of the motors 13 and 14.

The field windings 19 and 21 regulate the operation of the motors 13 and 14 in a manner to be described and are connected in series with a regulating generator 26 having a series field winding 27 and an adjustable rheostat 28 connected in series with its armature circuit. The regulating generator 26 has its rotor mechanically connected to the rotor of the generator 15, as diagrammatically indicated by the broken line 29.

The operation of the generator 15 is controlled through a winding 30 connected by an adjustable rheostat 31 and double-pole double-throw reversing switch 32 to a suitable source of direct-current, as diagrammatically illustrated by the battery 33. The circuit to the winding 30 is completed through the manually operable switch 34 and a normally closed relay switch 35. Operation of the reversing switch 32 will reverse the flow of current through the field winding 30 to change the polarity of output from the generator 15 and thereby reverse the operation of the motors 13 and 14. Starting and stopping of the system may be controlled by operation of the manually operable switch 34 which controls the energization of the winding 30, and thereby the output of the generator 15. In connection with the control features provided by the reversing switch 32 and the manually operable switches 34, 17 and 18, it is to be understood that such controls are diagrammatic for the purposes of this description and that in actual practice the usual conventional controls for controlling the operation of the generator 15 and selective operation of the motors 13 and 14 will be provided.

The output of the generator 26, which regulates the energization of the regulating field windings 19 and 22 for the motors 13 and 14, is under the control of a field winding 36 which has its terminals connected in shunt with the movable elements 37 and 38 of potentiometer-type rheostats 39 and 40. Each of the rheostats 39 and 40 has one terminal of its resistance element connected to one of the buses 23 by the lead 42. The manually adjustable resistance 41 connects the other resistance terminal of the rheostat 39 to the other of the buses 23 and the manually adjustable resistance 43 similarly connects the other resistance terminal of the rheostat 40 to the other of the buses 23. The resistances 41 and 43 provide an angular adjusting feature of a nature to be referred to later. By connecting the rheostats in the manner described, the movable elements 37 and 38 will be at the same potential when they occupy the same relative angular position with respect to the resistance elements 39 and 40. With the movable elements 37 and 38 in the same relative angular positions, as indicated in the drawing, the elements 37 and 38 will be at the same potential and there will be no current flow in the circuit to the control field winding 36 and such winding will be deenergized. However, when the elements 37 and 38 are moved to different positions relative to each other, they will be at different potentials, and the winding 36 will be energized in a direction and an amount corresponding to the angular displacement of the elements 37 and 38 with respect to each other. A relay coil 44 is included in the circuit to the control field winding 36 for energizing a solenoid 45 to open the contact 35 and shut down the apparatus when the elements 37 and 38 move too far out of positional agreement with each other. The movable elements 37 and 38 of the rheostats 39 and 40 are mechanically connected, respectively, to the motors 13 and 14, as schematically indicated by the broken lines 46 and 47. In this manner adjustment of the rheostats 39 and 40 by movement of the movable elements 37 and 38 will be a measure of the angular movement of the motors 13 and 14 and of the rotation of the drag-winches 11 and 12. Since the drag-winches 11 and 12 are connected to the drag-pipe 3, such movement of the movable elements 37 and 38 will also be a measure of the movement of the free end 5 of the drag-pipe 3 and of the flexible coupling 8. Displacement of the rheostat elements 37 and 38 with respect to each other will thereby be an indication of relative movement between the drag-pipe sections 6 and 7, and such displacement is employed through the regulating generator 26 to control the operation of the motors 13 and 14 in a manner to maintain the rotors of such motors in angular agreement with each other and thereby the drag-pipe sections 6 and 7 in axial alignment with each other.

Relative movement between the drag-pipe sections 6 and 7 out of axial alignment with each other during raising and lowering movements of the drag-pipe 3 is caused by the motors 13 and 14 operating at different speeds and moving out of positions in angular agreement with each other. This relative movement will cause movement of the rheostat elements 37 and 38 to positions out of angular agreement with each other to thereby energize the control field winding 36 and vary the output of the regulating generator 26. In order that the varying output of the regulating generator 26 will be effective to regulate the operation of the motors 13 and 14 to bring such motors back into positions of angular agreement with each other and to thereby return the drag-pipe sections 6 and 7 to positions in axial alignment with each other, the windings 19 and 21 are wound in reverse fashion so that a variation in the output of the regulating generator 26 will be effective to cause one of the motors 13 or 14 to speed up and the other of such motors to slow down. The speed regulation of the motors 13 and 14 is continued until the appropriate parts are brought back into positions of agreement with each other.

The regulating generator 26 is an amplifying type of generator which is effective to amplify the change in excitation of the control winding 36, which change in excitation in a measure of the difference in angular positions of the movable rheostat elements 37 and 38. By amplifying the control values fed to the control field winding 36 by the rheostats 39 and 40, the motors 13 and 14 and parts driven thereby will be maintained more closely in positions of angular agreement with each other. In order that the generator 26 will be effective to provide maximum amplification of the control values fed to the control winding 36, the resistor 28 is adjusted to a critical value, providing what is termed herein as "instable" operation of the regulating generator 26. What is meant by instable operation will be best understood by referring to the explanatory curve of Fig. 2 which shows the saturation curve X of a direct-current series generator having a series field winding, such as the series field winding 27. As is well known, stable operation of a series generator is possible only if the resistance of its armature circuit is less than that of a line R tangential to the saturation curve X, such as a resistance corresponding to the line Y. For a resistance corresponding to the line Y, the generator voltage will build up to the point of intersection of the line Y with the saturation curve X, such as the point Y' or Y'', and stable operation will be had at such points and other points along the saturation curve X outwardly from the points Y' and Y''. For a resistance greater than the line R tangential to the saturation curve X, such as a resistance corresponding to the line Z, the generator voltage cannot build up. For a resistance in the load circuit of a series generator corresponding to the line R, the generator may have a value equal to any of the ordinates along the line of tangency of the line R with the saturation curve X. The resistor 28 is adjusted to a critical value for the regulating generator 26 corresponding to the line R, so that the output of the generator 26 may be regulated between the points R' and R'' along its saturation curve. In this manner a very slight change in the field current of the generator 26, as by a varying control current in the field winding 36, will be effective to cause an amplified output voltage from the regulating generator 26. From the foregoing, it will be understood that when the generator is described as having instable operation herein and in the claims, there is meant a series generator of the self-excited type, having the resistance of its load circuit adjusted to a value at which it may be regulated substantially along the straight line portion of its saturation curve.

With the regulating generator 26 adjusted for instable operation in the manner described above, external field control will be provided by the control field winding 36 to hold its output steady at a given point along its saturation curve between the points R' and R''. In other words, a balance condition will be effected with the output of the regulating generator 26 at a steady value maintaining the motors 13 and 14 and parts driven thereby in positions of angular agreement with each other. In the event that such parts move out of positions in angular agreement with each other, the rheostats 39 and 40 will function immediately through the regulating generator 26 to effect the proper regulation of the motors 13 and 14.

The foregoing description has proceeded on the assumption that the drag-pipe sections are to be maintained in axial alignment with each other. For this purpose the adjustable resistances are not essential since they are used only for the purpose of placing the resistance terminals of the rheostats 39 and 40 at the same relative potentials. If it is desired that the sections 6 and 7 occupy an angular position relative to each other, then it is merely necessary to adjust one of the resistances 41 or 43 according to the direction of angular inclination desired. Adjustment of one of such resistances will change the voltage drop along the resistance element of the appropriate rheostats 39 and 40 and place the movable elements 37 and 38 at different potentials. This will energize the field 36 to displace the motors 13 and 14 an amount to move the elements 37 and 38 to positions at which their potentials are equal. After the system has reached a condition of balance with the driven elements occupying new positions out of agreement with each other an amount corresponding to the adjustment of one of the resistances 41 or 43, the system will operate as described above to maintain the relative positions of the driven parts displaced from each other a predetermined amount. If desired, the resistances 41 and 43 may be gauged for simultaneous operation. Although the description has been applied specifically to the application of the system for maintaining the relative positions of drag-pipe sections, it will be understood from the foregoing that the system is equally applicable to the positioning of other apparatus where drive motors or objects driven thereby are to be maintained in positional agreement or in relative positions displaced from each other a predetermined amount.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In dredging apparatus on a dredge ship the combination of, a drag-pipe supported at one end by the dredge ship for pivotal movement with respect thereto, said drag-pipe being formed of two sections and having a flexible coupling connecting said sections to provide for movement of said sections angularly relative to each other, means for raising and lowering said pipe comprising a drag-line connected to said pipe adjacent its free end and a drag-line connected to said pipe adjacent said coupling, each of said drag-lines, respectively, being provided with a drag-winch and a motor for operating the same, control means for said motors operative to maintain the sections of said pipe in a selected angular position with respect to each other during raising and lowering operation of said pipe, and means for adjusting said control means to effect unequal operation of said motors and thereby angularly displace said drag-pipe sections relative to each other a selected amount, said control means being operable after operation of said adjusting means to maintain said sections angularly displaced said selected predetermined amount during subsequent raising and lowering operations of said drag-pipe.

2. In dredging apparatus on a dredge ship, the combination of, a drag-pipe supported at one end by the dredge ship for pivotal movement with respect thereto, said drag-pipe being formed of two sections and having a flexible coupling connecting said sections to provide for movement of said sections angularly relative to each other, means for raising and lowering said pipe comprising a drag-line connected to said pipe adjacent its free end and a drag-line connected to said pipe adjacent said coupling, each of said drag-lines, respectively, being provided with a drag-winch and a motor for operating the same, control means for correlating the operation of said motors to maintain said sections in a selected angular position with respect to each other during raising and lowering operations, a pair of rheostats each movable in accordance with the movement with respect to said dredge ship of the points of connection of said drag-lines with said drag-pipe, means operative upon movement of said rheostatse out of positional agreement with each other in response to movement of said sections out of said relative angular position to operate said control means to return said sections to their selected angular position relative to each other, and means for adjusting the operation of said rheostats to effect a preselected angular displacement of said sections relative to each other, said control means being thereafter operable to maintain the preselected angularly displaced condition of said sections.

3. In a dredging apparatus on a dredge ship, the combination of, a drag-pipe supported at one end by the dredge ship for pivotal movement with respect thereto, said drag-pipe being formed of two sections and having a flexible coupling connecting said sections to provide for movement of said sections angularly relative to each other, means for raising and lowering said pipe comprising a drag-line connected to said pipe adjacent its free end and a drag-line connected to said pipe adjacent said coupling, each of said drag-line, respectively, being provided with a drag-winch and a motor for operating the same, control means for said motors comprising an individual control field winding for each of said motors, a regulating generator for energizing said windings, said windings being arranged so that when one of said windings operates to increase the excitation of one of said motors the other of said windings operates to decrease the excitation of the other of said motors, and means operative upon relative movement of said sections out of the selected angular position relative to each other in response to unequal operation of said motors during raising or lowering operations of said drag-pipe to vary the output of said generator to thereby operate said motors to return said pipe sections to said selected angular position relative to each other.

4. In a dredging apparatus on a dredge ship, the combination of, a drag-pipe supported at one end by the dredge ship for pivotal movement with respect thereto, said drag pipe being formed of two sections and having a flexible coupling connecting said sections to provide for movement of said sections angularly relative to each other, means for raising and lowering said pipe comprising a drag-line connected to said pipe adjacent its free end and a drag-line connected to said pipe adjacent said coupling, each of said drag-lines, respectively, being provided with a drag-winch and a motor for operating the same, control means for said motors comprising an individual control field winding for each of said motors, a regulating generator for energizing said windings, said windings being arranged so that when one of said windings operates to increase the excitation of one of said motors the other of said windings operates to decrease the excitation of the other of said motors, a pair of rheostats responsive to the movements with respect to the dredge ship of the points of connection of said drag-line with said drag-line, respectively, and means responsive to movement of said rheostats out of a normal position relative to each other in response to angular movement of said sections relative to each other for varying the output of said generator to thereby operate said motors to return said sections to said selected relative angular position.

5. In a dredging apparatus on a dredge ship, the combination of a drag-pipe supported at one end by the dredge ship for pivotal movement with respect thereto, said drag-pipe being formed of two sections and having a flexible coupling connecting said sections to provide for movement of said sections angularly relative to each other, means for raising and lowering said pipe comprising a drag-line connected to said pipe adjacent its free end and a drag-line connected to said pipe adjacent said coupling, each of said drag-lines, respectively, being provided with a drag-winch and a motor for operating the same, control means for said motors comprising an individual control field winding for each of said motors, a regulating generator for energizing said windings, said windings being arranged so that when one of said windings operates to increase the excitation of one of said motors the other of said windings operates to decrease the excitation of the other of said motors, a pair of rheostats responsive to the movements with respect to the dredge ship of the points of connection of said drag-lines with said drag-pipe, respectively, a control circuit including a regulating field winding for said generator bridging said rheostats, said rheostats being operative upon movement out of positional agreement with each other in response to angular movement of said sections relative to each other during raising and lowering operations of said drag-pipe to supply a regulating potential to said regulating winding to vary the output of said generator and thereby operate said motors to return said pipe sections to their said selected relative angular position with respect to each other.

6. In a dredging apparatus on a dredge ship, the combination of a drag-pipe supported at one end by the dredge ship for pivotal movement with respect thereto, said drag-pipe being formed of two sections and having a flexible coupling connecting said sections to provide for movement of said sections angularly relative to each other, means for raising and lowering said pipe comprising a drag-line connected to said pipe adjacent its free end and a drag-line connected to said pipe adjacent said coupling, each of said drag-lines, respectively, being provided with a drag-winch and a motor for operating the same, control means for said motors comprising an individual control field winding for each of said motors, a regulating generator for energizing said windings, said windings being arranged so that when one of said windings operates to increase the excitation of one of said motors the other of said windings operates to decrease the excitation of the other of said motors, said regulating generator having an armature circuit including a series field and a resistance, the resistance of said circuit being selected to provide instable operation of said generator, a control field winding for said generator separate from said series field, and means operative upon movement of said sections out of their selected angular position relative to each other during a raising or lowering operation of said drag-pipe for varying the energization of said generator control field winding to thereby vary the output of said generator and operate said motors to return said pipe sections to their selected angular position relative to each other.

7. In a dredging apparatus on a dredge ship, the combination of, a drag-pipe supported at one end by the dredge ship for pivotal movement with respect thereto, said drag-pipe being formed of two sections and having a flexible coupling connecting said sections to provide for movement of said sections angularly relative to each other, means for raising and lowering said pipe comprising a drag-line connected to said pipe adjacent its free end and a drag-line connected to said pipe adjacent said coupling, each of said drag-lines, respectively, being provided with a drag-winch and a motor for operating the same, control means for said motors comprising an individual control field winding for each of said motors, a regulating generator for energizing said windings, said windings being arranged so that when one of said windings operates to increase the excitation of one of said motors the other of said windings operates to decrease the excitation of the other of said motors, a control field winding for said generator, said generator being provided with a series field winding and a resistance in its armature circuit, said resistance being adjusted to a critical value providing instable operation of said generator such that a slight variation of its said control field winding will result in an amplified output of said generator, and means operative upon angular movement of said sections out of their selected angular position relative to each other during a raising or lowering operation of said drag-pipe for varying the energization of said generator control field winding to thereby vary the output of said generator and operate said motors to return said pipe sections to their selected angular position relative to each other.

8. In positioning control apparatus, a pair of machines the respective positions of which are to be maintained in positional agreement with each other, each of said machines being provided with a regulating field winding, said field windings being arranged so that when the excitation provided by one of said windings is increased the excitation provided by the other of said field windings will be decreased, a regulating generator for energizing said field windings, said generator having a series field winding and a resistance in its armature circuit and a control field winding separate from said series field, said resistance being adjusted to a critical value providing instable operation of said generator such that a small variation in the energization of said control field winding will result in an amplified output of said generator, and means controlling the energization of said control field winding including a pair of rheostats respectively operable to positions corresponding to the positions of said machines, and circuit means for energizing said control field winding in accordance with the positional disagreement of said rheostats to vary the output of said generator and thereby the operation of said machines so as to maintain said machines in positional agreement with each other.

9. In positioning control apparatus, a pair of machines the respective positions of which are to be maintained in positional agreement with each other, each of said machines being provided with a regulating field winding, said field windings being arranged so that when the excitation provided by one of said windings is increased the excitation provided by the other of said field windings will be decreased, a regulating generator for energizing said field windings, said generator having a series field winding and a resistance in its armature circuit and a control field winding separate from said series field, said resistance being adjusted to a critical value providing unstable operation of said generator such that a small variation in the energization of said control field winding will result in an amplified output of said generator, and means responsive to movement of said machines out of positional agreement with each other for energizing said control field winding to vary the output of said generator and thereby regulate the operation of said machines to restore their condition of positional agreement with each other.

10. In positioning control apparatus, a pair of machines the respective positions of which are to be maintained in positional agreement with each other, each of said machines being provided with a regulating field winding, said field windings being arranged so that when the excitation provided by one of said windings is increased the excitation provided by the other of said field windings will be decreased, a regulating generator for energizing said field windings, said regulating generator having an armature circuit including a series field and a resistance, the resistance of said circuit being selected to provide instable operation of said generator, a control field winding for said generator separate from said series field, and means operative upon movement of said machines out of positional agreement with each other for varying the energization of said control field winding to vary the output of said generator and thereby regulate the operation of said machines to restore their condition of positional agreement with each other.

11. In positioning control apparatus, a pair of machines the respective positions of which are to be maintained in positional agreement with each other, each of said machines being provided with a regulating field winding, said field windings being arranged so that when the excitation provided by one of said windings is increased the excitation provided by the other of said field windings will be decreased, a regulating generator for energizing said field windings, a control field winding for said generator, and means operative upon movement of said machines out of positional agreement with each other for varying the energization of said control field winding to vary the output of said generator and thereby regulate the operation of said machines to restore their condition of positional agreement with each other.

12. In positioning control apparatus, a pair of machines the respective positions of which are to be maintained in positional agreement with each other, each of said machines being provided with a regulating field winding, said field windings being arranged so that when the excitation provided by one of said windings is increased the excitation provided by the other of said field windings will be decreased, a regulating generator for energizing said field windings, a control field winding for said generator, and means controlling the energization of said control field winding including a pair of rheostats respectively operable to positions corresponding to the positions of said machines, and circuit means for energizing said control field winding in accordance with the positional disagreement of said rheostats to vary the output of said generator and thereby the operation of said machines so as to maintain said machines in positional agreement with each other.

13. In positioning control apparatus, a pair of machines the respective positions of which are to be maintained in positional agreement with each other, each of said machines being provided with a regulating field winding, said field windings being arrranged so that when the excitation provided by one of said windings is increased the excitation provided by the other of said field windings will be decreased, a regulating generator for energizing said field windings, a control field winding for said generator, and means controlling the energization of said control field winding including a pair of rheostats respectively operable to positions corresponding to the positions of said machines, and circuit means for energizing said control field winding in accordance with the positional disagreement of said rheostats to vary the output of said generator and thereby the operation of said machines so as to maintain said machines in positional agreement with each other, and means for adjusting the operation of said rheostats to effect relative movement between said machines a predetermined amount to change the respective machine positions which are to be maintained in positional agreement.

14. In positioning control apparatus, a pair of machines the respective positions of which are to be maintained in positional agreement with each other, regulating means for correlating the operation of said machines to maintain them in a normal condition in positional agreement with each other, a pair of rheostats movable in accordance with the positions of said machines, respectively, and means operative upon movement of said rheostats out of positional agreement with each other in response to movement of said machines out of positional agreement with each other for operating said regulating means to return said machines to their normal condition in positional agreement with each other and an adjustable resistance for varying the operation of at least one of said rheostats to thereby change the respective positions of said machines which are to be maintained in positional agreement with each other.

15. In positioning control apparatus, a pair of machines the respective positions of which are to be maintained in positional agreement with each other, regulating means for correlating the operation of said machines to maintain them in a normal condition in positional agreement with each other comprising a regulating generator having a variable output, a pair of rheostats movable in accordance with the positions of said machines respectively, and means operative upon movement of said rheostats out of positional agreement with each other in response to movement of said machines out of positional agreement for varying the output of said generator to thereby regulate the operation of said machines to restore their normal condition in positional agreement with each other.

GEORGE E. KING.

REFERENCES CITED

The following references are of record in the file of this patent:

UNITED STATES PATENTS

| Number | Name | Date |
|---|---|---|
| 1,853,663 | Cottrell | Apr. 12, 1932 |
| 1,961,350 | Grunsky | June 5, 1934 |

FOREIGN PATENTS

| Number | Country | Date |
|---|---|---|
| 709,509 | France | May 18, 1931 |